US 6,624,925 B2

(12) United States Patent
Hasson et al.

(10) Patent No.: US 6,624,925 B2
(45) Date of Patent: Sep. 23, 2003

(54) OPTICAL AMPLIFIER EMPLOYING AN ACTIVE DOPED UNITARY AMPLIFIER

(75) Inventors: Victor Hasson, Winchester, MA (US); Hsian P. Chou, Winchester, MA (US)

(73) Assignee: Textron Systems Corporation, Wilmington, MA (US)

( * ) Notice: Subject to any disclaimer, the term of this patent is extended or adjusted under 35 U.S.C. 154(b) by 53 days.

(21) Appl. No.: 09/804,813

(22) Filed: Mar. 13, 2001

(65) Prior Publication Data

US 2002/0131163 A1 Sep. 19, 2002

(51) Int. Cl.$^7$ ............................... H01S 3/17; H01S 3/00
(52) U.S. Cl. ........................................ 359/333; 359/337
(58) Field of Search .................. 385/14, 133; 359/333, 359/344, 337, 343, 342; 356/3.01–3.05; 372/40; 501/37, 50

(56) References Cited

U.S. PATENT DOCUMENTS

| | | | |
|---|---|---|---|
| 3,617,917 A | * 11/1971 | Uchida | 330/4.3 |
| 3,772,528 A | 11/1973 | Anderson | 307/88.3 |
| 4,186,046 A | * 1/1980 | DeLai et al. | 156/605 |
| 4,902,125 A | * 2/1990 | Keene et al. | 356/28.5 |
| 4,927,263 A | 5/1990 | de Groot et al. | 356/8 |
| 5,101,461 A | 3/1992 | Nakajima | 385/42 |
| 5,216,259 A | * 6/1993 | Stern et al. | 250/559.38 |
| 5,475,528 A | 12/1995 | LaBorde | 359/341 |
| 5,574,553 A | 11/1996 | McManamon et al. | 356/5.15 |
| 5,629,953 A | 5/1997 | Bishop et al. | 372/39 |
| H1673 H | 8/1997 | Hanson | 372/35 |
| 4,001,742 A | 8/1998 | Richmond | 356/4.01 |
| 5,802,084 A | 9/1998 | Bowers et al. | 372/18 |
| 5,835,260 A | 11/1998 | Kosaka et al. | 359/341 |
| 5,892,575 A | 4/1999 | Marino | 356/5.01 |
| 6,233,045 B1 | 5/2001 | Suni et al. | 356/28.5 |
| 6,236,793 B1 | 5/2001 | Lawrence et al. | 385/132 |
| 6,347,106 B1 | 2/2002 | Dijaili et al. | 372/46 |
| 6,433,927 B1 | * 8/2002 | Nyman et al. | 359/343 |

FOREIGN PATENT DOCUMENTS

| | | | |
|---|---|---|---|
| JP | 401128553 A | 5/1989 | 257/720 |

OTHER PUBLICATIONS

Pope et al. "Nd–Doped Silica glass. I. Structural Evolution in the Sol–gel State." J. Non–Crystaline Solids Dec. 1988., pp. 236–241.*

* cited by examiner

Primary Examiner—Thomas G. Black
Assistant Examiner—Stephen Cunningham
(74) Attorney, Agent, or Firm—Weingarten, Schurgin, Gagnebin & Lebovici LLP

(57) ABSTRACT

An active optical amplifier in which a unitary optical amplifier constructed from a unitary optically transparent chip that has been doped so as to be optically active, amplifies incoming signal photons when excited by a pump laser of sufficient energy. The unitary optical amplifier receives input photons and pump laser energy and provides output photons that have the same spatial orientation and phase as the corresponding input photons. A laser direction and ranging (LADAR) may be constructed from the active optical amplifier by further including first imaging optics to focus the input photons onto the surface of the unitary optical amplifier and second imaging optics to focus the output photons from the active unitary optical amplifier onto a focal plane image sensor array. The electronic signals from the focal plane image sensor array may then be displayed on a conventional display. A plurality of unitary optically transparent amplifier chips are configured in a stacked arrangement, each receiving a pump signal, and the stacked arrangement provides for the amplification of input photons.

58 Claims, 4 Drawing Sheets

OPTICAL AMPLIFIER EMPLOYING AN ACTIVE DOPED UNITARY AMPLIFIER

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Optical amplifiers that employ a doped medium that are excited by a pump source are well known. The pump source excites at least a portion of the dopant atoms to create a population inversion of electrons. This population inversion of electrons provides stimulated emission when an incoming signal photon strikes one or more of the excited electrons. These pumped optical amplifiers are typically constructed out of one or more optical fibers that are doped with an optically active dopant. If more than one fiber is used, for example in imaging applications, the optical fibers are typically rigidly bundled together at the input and output of the optical fiber to preserve the spatial orientation of the incoming photons by preventing an optical fiber from shifting in position. Although doped optical fibers can provide high amplification of an optical sign with a low noise figure, there are problems associated with doped optical fiber amplifiers.

For instance, when bundled together, a plurality of doped optical fiber amplifiers can be difficult to construct so as to maintain the optical fibers in the desired orientation. In addition, it is important to maintain good optical isolation between the optical fibers in a compact package. Furthermore, doped optical fiber amplifiers require coupling to and from the optical fiber it is connected to. This coupling can cause signal loss due to the losses inherent in the use of connectors and due to the alignment errors between the connectors themselves and the fiber optic cable.

It would therefore be advantageous to provide an optical amplifier that provides amplification of an optical signal that provides both high gain and a low noise figure without the inherent complexity of forming bundles of optical fibers with the attendant alignment and connector losses.

BRIEF SUMMARY OF THE INVENTION

An active optical amplifier is disclosed in which a unitary optical amplifier, is constructed from a unitary optically transparent chip that has been doped so as to be optically active. The chip amplifies incoming signal photons when excited by a pump source of sufficient energy. The unitary optical amplifier receives input photons and pump laser energy and provides output photons that have the same spatial orientation, phase, and polarization as the corresponding input photons. The unitary optical amplifier may be constructed from glass such as silicate and phosphate glass or other materials that may be doped so as to become optically active. Various materials may be selected based on their electron structure to act as dopants. In one embodiment Erbium is used as a dopant. Alternatively, Neodymium may be used. In addition, an optically transparent heat transfer medium may be thermally coupled to the unitary optical amplifier in order to transfer heat away from the amplifier. In one embodiment, the optically transparent heat transfer medium is a thin diamond plate that is thermally coupled to a surface of the unitary optical amplifier. A heat sink or electro-thermal system may be employed to transfer heat from the optically transparent heat transfer medium.

A laser direction and ranging (LADAR) may be constructed from the active optical amplifier by further including first imaging optics to focus the input photons onto the surface of the unitary optical amplifier and second imaging optics to focus the output photons from the active unitary optical amplifier onto a focal plane image sensor array. The electronic signals from the focal plane image sensor array may then be displayed on a conventional display. A calibration system may be employed to provide offset correction values for each pixel to account for variations in the gain of the unitary optical amplifier. Alternatively, an optically transparent heat transfer medium, such as a diamond, may be thermally coupled to the active optical amplifier to remove heat therefrom.

The active optical amplifier may include a plurality of unitary optical amplifier chips configured in a stacked arrangement. Each of the amplifier chips receives photons from the preceding adjacent amplifier chip and provides output photons to the next adjacent amplifier chip. At least one optically transparent heat transfer medium, such as a diamond plate, may be thermally coupled to the juxtaposed faces of adjacent amplifier chips to remove heat therefrom.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

Figure 1:
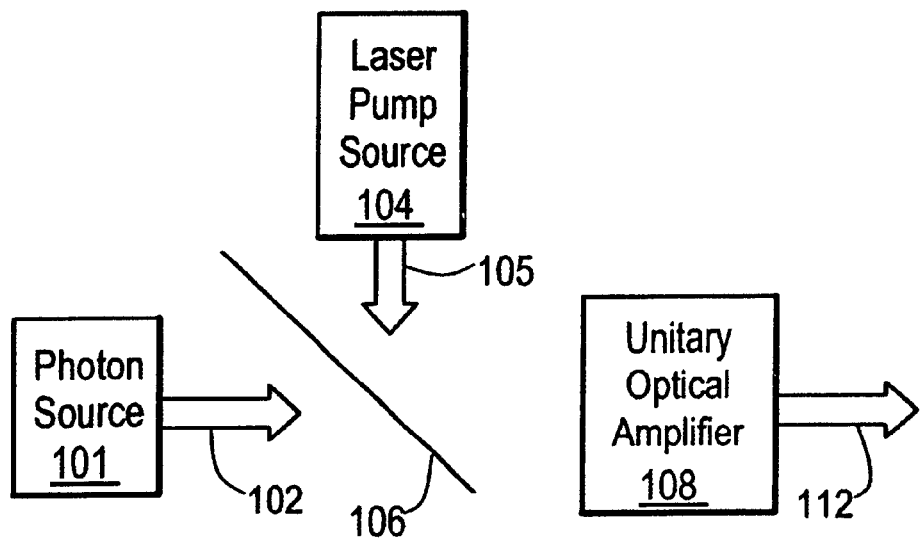
FIG. 1 is a block diagram of one embodiment of the presently disclosed active optical amplifier.

FIG. 1 illustrates an amplifier for optical signals consistent with the present invention that includes a unitary optically transparent amplifier 108 that receives input photons 102. The input photons 102, received from an optical source 101, have a particular spatial orientation or position, wavelength, polarization, and phase. The input plurality of photons may be, for example, a plurality of isolated and separate optical communication signals or a plurality of photons reflected from one or more objects forming an image.

The unitary optically transparent amplifier 108 also receives pump energy in the form of a pump energy signal 105 having a pump wavelength, from a laser pump source 104. In the illustrated embodiment, a dichroic mirror 106 is used to reflect the pump energy into the unitary optical amplifier 108 while allowing the input photons 102 to pass through the mirror 106 to the amplifier 108. The unitary optically transparent amplifier 108 provides as an output, photons 112 that are more numerous than the input photons and have the same spatial orientation, wavelength, polarization, and phase as the corresponding input photons 102.

The unitary optical amplifier 108 is constructed of one or more elements that are substantially optically transparent at a predetermined wavelength, which is typically the wavelength of the input photons 102. These elements are formed into a single unitary optically transparent chip. Silicate glass, phosphate glass, plastic, optical gels, liquids or other materials that may be doped with dopants that are optically active and able to be optically pumped may be used to construct the unitary optical amplifier. In addition, semiconductor materials and crystalline materials doped with materials such as Neodymium (Nd) and used as the material in a unitary optical amplifier. One advantage of the use of a typical crystalline material is that a crystalline material typically has a narrower gain bandwidth product. Thus, to achieve an equivalent level of amplification to other materials, a doped crystalline material typically requires a low pump energy. In addition, a narrower gain bandwidth product also provides a better match between the bandwidth of the input signals and the bandwidth of the optical amplifier. This better match results in less noise, and in some applications obviates the need for narrow band optical filters.

In an optically pumped system, the wavelength of the incoming photons and the pump wavelengths should be spaced as far apart as practical to ensure that minimal cross-talk occurs between the two signals and that little additional noise is added to the output amplified photon signal. In addition, the material used to construct the unitary optical amplifier should not be lossy at the pump wavelength, although an increase in loss at the pump wavelength may be overcome using a more powerful laser pump source 105. In one embodiment, the wavelength of the incoming photons is generally in the range between 1.4 and 1.7 microns in wavelength, and in a preferred embodiment, the first wavelength is 1.55 microns in wavelength. The pump wavelength is generally in the range between 0.800 and 1.0 microns, and in a preferred embodiment, the pump wavelength is 0.980 microns.

Because of its optical properties at the preferred wavelength of the input photons and the pump wavelength, the unitary optical amplifier is constructed from silicate glass doped with optically active dopants. Advantageously, silicate glass has an attenuation minimum in the 1500 nm range, and also has low attenuation in the 800 and 980 nm band of wavelengths as well. Other forms of glass that may be doped with optically active dopants may also be used. For example, doped phosphate glass, $P_2O_5$, may be used to construct the unitary optical amplifier. Alternatively, $GeO_2$ and $B_2O_3$ glasses may be employed.

Figure 4:
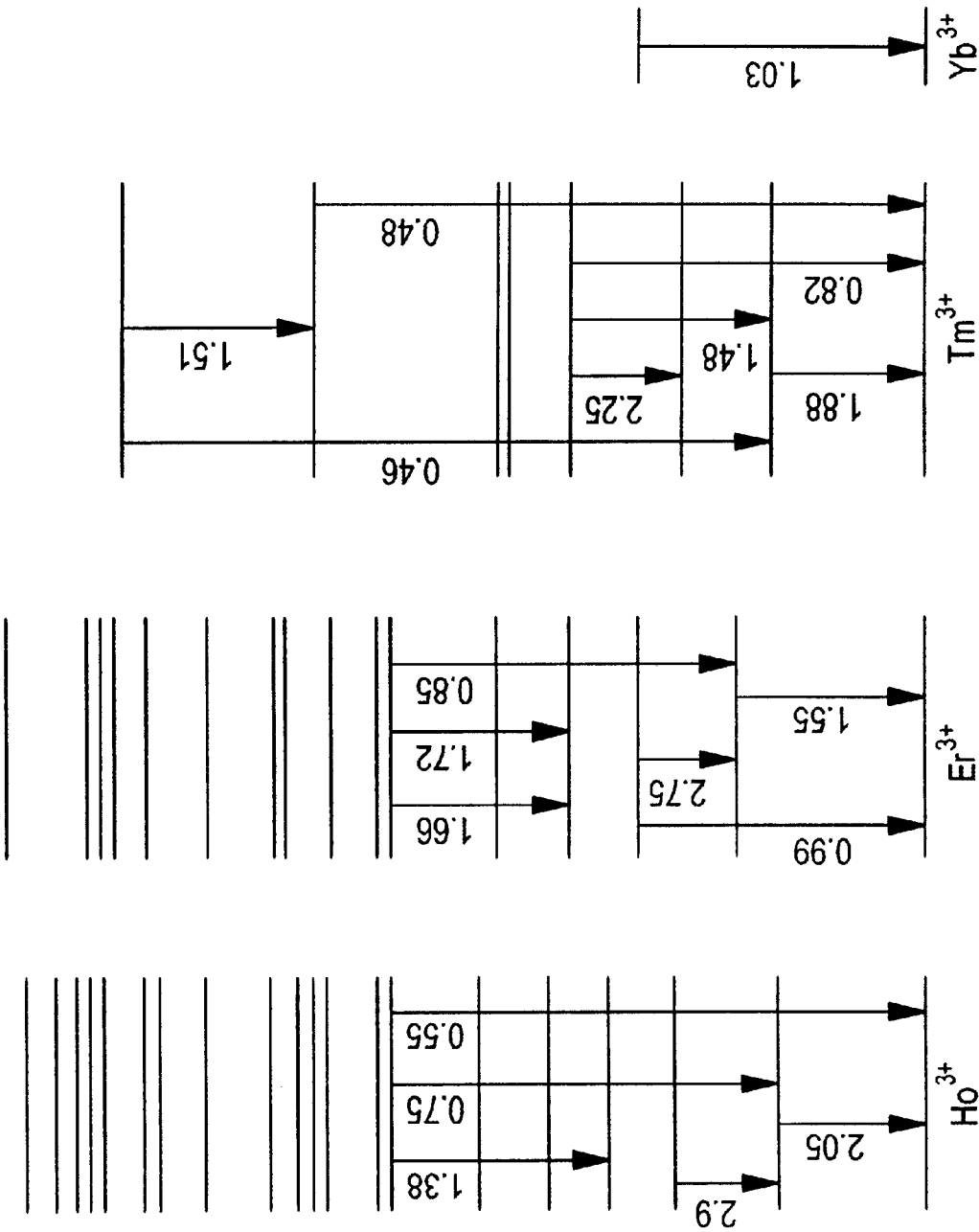
FIG. 4 is a graph showing various lasing transitions for trivalent rare earth materials in glass hosts.

The unitary optical amplifier is doped with an optically active dopant that provides a population inversion when excited by the pump wavelength. Two common dopants that may be used include Erbium and Neodymium. FIG. 4 illustrates reported 4f→4f lasing transitions for trivalent rare earth materials in glass hosts. As illustrated in FIG. 4, other rare earth materials may be used as dopants depending on the level of amplification, noise, bandwidth, and other physical characteristics required by a particular application. In addition, rare earth materials may be associated in pairs, in a donor-acceptor configuration. For example, ytterbium and erbium may be used together as illustrated. In some circumstances, energy transfer between the donor and acceptor ions can be achieved. Other rare earth materials may be used as a dopant within a unitary optical amplifier to achieve desired characteristics for a particular application.

Typically, the unitary optical amplifier is used as a preamplifier and is operated in the small-signal portion of the amplifier gain curve. Operation in the small signal portion allows the unitary optical amplifier to operate without depleting the medium during operation and causing non-linear distortion and noise to the input signal(s). Operation in the small signal portion of the amplifier gain is important to avoid a first input signal depleting the amplifier medium and resulting in a second input signal being amplified less than the expected value or non-linearly amplified. This would create cross talk between the first and second signals as the amplification level of the second signal varies with the changing level of the first signal.

In general, the unitary optical amplifier has spatial doping concentration that is substantially homogeneous throughout the unitary optical amplifier. This homogeneity avoids spatially inconsistent and non-linear amplification of the input signal. This spatial homogeneity of doping levels helps ensure that the unitary optical amplifier provides a uniform amplification to an incoming signal regardless of the path that the incoming signal takes through the amplifier.

Small variations in the doping density caused by small changes in the manufacturing process parameters may result in non-uniform amplification of incoming light signals. The unitary optical amplifier may be calibrated prior to use by using a laser source to illuminate a smooth calibration target and electronically measuring the output signals from the unitary optical amplifier. The small variations in the resultant output, which are indicative of the gain variations, are provided to the imaging system as a series of correction values for the appropriate pixels.

There may be applications, however, in which a constant amplifier small-signal gain by the unitary optical amplifier is not desired. In this instance, the unitary optical amplifier can be doped or pumped at varying levels to provide the desired spatially variable amplification or to operate non-linearly by providing for a greater amplification level that is out of the small signal region.

$Er_2O_3$ may be added to the silicate or phosphate glass matrix or other material to dope the unitary optical amplifier with active Er ions. The doping density of the $Er_2O_3$ may be varied according to the specific requirements of the system that is being designed, and in a preferred embodiment the doping concentration of the $Er_2O_3$ is 2% by weight of the unitary optical amplifier 108. The level of the doping concentration is specified to maintain the overall optical integrity of the material being doped. The doping concentration should be such that the material being doped remains within the glass phase of the material and does not transition into the ceramic phase of the material. As is known in the art, too high a doping level can lead to self-quenching and if the material being doped transitions into the ceramic phase, micro-cracking of the material used to construct the unitary optical amplifier can occur.

The use of active Er ions as a dopant has several advantages. For example, active Er ions are known to have quantum levels that allow it to be excited by photons having wavelengths of 800 nm or 980 nm and 1480 nm. Good optical pumping sources are readily available at these wavelengths. Various forms of optical pumping may be used to excite the unitary optical amplifier. For example, a flashlamp or other high-energy light source having a suitable power level may be used to pump the unitary optical amplifier. Alternatively, a laser of having an output frequency and power that is suitable for pumping the unitary optical amplifier may be used as well. If a semiconductor material is used to construct the unitary optical amplifier various dopants may be selected to provide the necessary gain and the pump energy may be either optical or electrical depending upon the architecture of the unitary optical amplifier and the dopant material used.

Erbium not only provides electrons receptive to various pump energies, but it also provides electrons having quantum levels that can be stimulated to emit in the 1540 nm band range. Thus, using Erbium as the dopant allows the pump energy and the signal energy to be sufficiently spaced apart that minimal cross-talk and noise will be generated by the two signals. Another advantage of the use of Erbium ions is that the 1540 nm wavelength band provides for an "eye-safe" output signal. As is known, light in this wavelength range is not readily absorbed by the human eye and hence is less damaging than other wavelengths. Other materials and combinations of materials as described above that have an electron energy structure that provides these advantages are known to those of skill in the art and may be used as well. The use of Erbium, or other materials having similar optically active properties, may be used with a pump laser of sufficient power to construct a unitary optical amplfier having an optical gain of greater than 15 dB with a corresponding noise figure of less than 2.5.

The unitary optical amplifier 108 may be any shape that is necessary for a particular system or is convenient to manufacture. For example, the unitary amplifier could be a cube, parallelepiped, or other geometric shape, In a preferred embodiment, the unitary optical amplifier 108 is a solid cylinder or rod having a diameter of between 0.1 and 0.75 cm and a length between 2.5 cm to 10 cm. In a preferred embodiment, the diameter of the cylinder is 0.5 cm, and the length of the cylinder is 5 cm.

Figure 2:
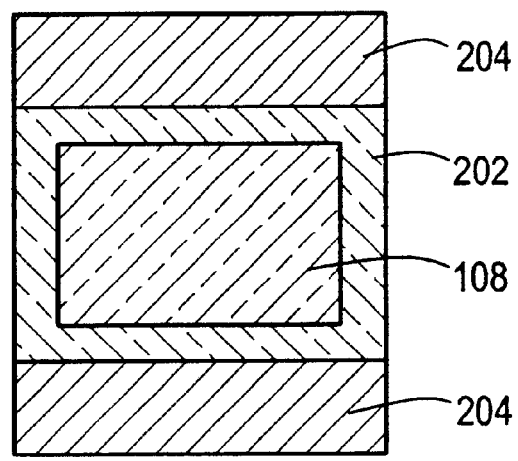
FIG. 2 is a schematic block diagram of a heat transfer system suitable for use with the active optical amplifier illustrated in FIG. 1.

During some modes of operations, in particular when a high average pump power is used to excite the unitary optical amplifier, the unitary optical amplifier generates heat that must be removed from the unitary optical amplifier. This heat can cause damage the unitary optical chip and negatively affect the operation of the unitary optical amplifier. FIG. 2 illustrates one embodiment of a heat transfer system for the unitary optical amplifier 108, in which a layer of an optically transparent heat transfer medium 202 is placed in thermal contact with one or more outer surfaces of the unitary optical amplifier 108. The optically transparent heat transfer medium 202 is thermally coupled to a heat transfer system 204. In a preferred embodiment, the optically transparent heat transfer medium 202 can be a thin diamond plate thermally coupled to the unitary optical amplifier 108 and extending beyond the edges thereof. More than one surface of the unitary optical amplifier may be used to provide for heat transfer. In the embodiment depicted in FIG. 2, multiple plates of the thin diamond material are used to transfer the heat from the unitary optical amplifier.

The heat transfer system 204 may include a conventional heat sink or a thermoelectric Peltier device. Other thermal transfer systems may be utilized as well depending upon the application of the unitary optical amplifier and the rate at which heat must be transferred from the unitary optical amplifier 108. As will be explained in more detail below, in a laser detection and range (LADAR) system there may be either a continuous wave (CW) illumination of a target, or a pulsed wave illumination of the target. Different cooling methods may be utilized for heat transfer and removal from the unitary optical amplifier system at higher average powers.

Figure 5:
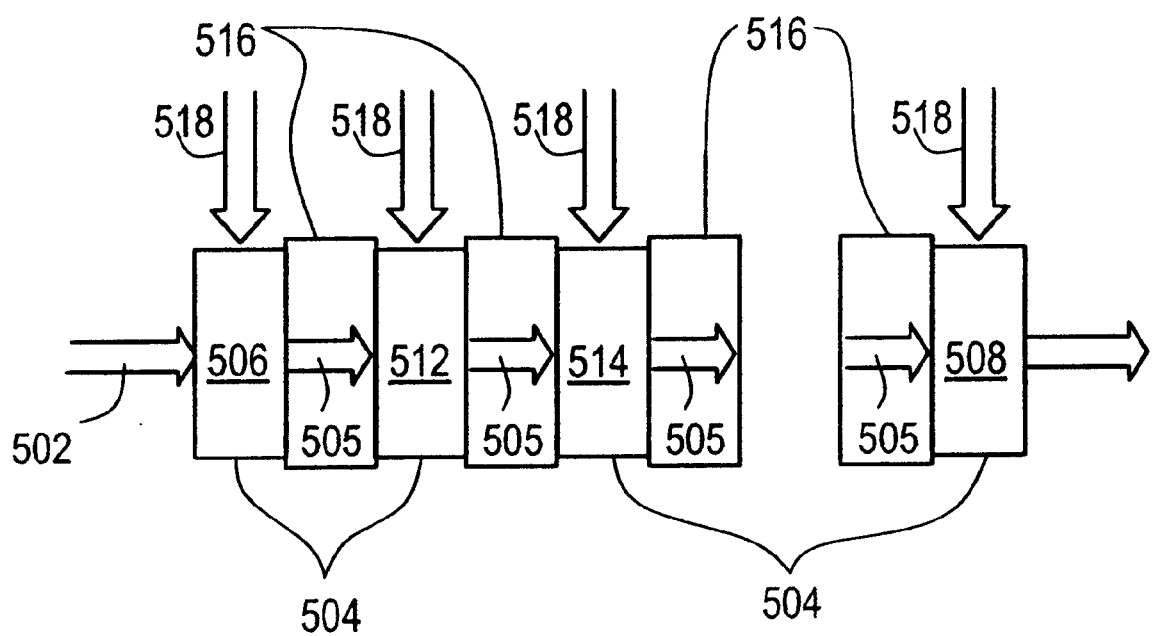
FIG. 5 is a schematic block diagram of another embodiment of an active optical amplifier.

As illustrated in FIG. 5, an optical amplifier 500 may be constructed from a plurality of unitary optically transparent amplifier chips 504 configured in a stacked arrangement. The plurality of unitary optically transparent amplifier chips 504 include an input chip 506 for receiving an input optical signal 502 and an output chip 508 providing an output optical signal 510. Each individual amplifier chip 504 is coupled to a pump signal 518 of sufficient energy to provide for an electron population inversion therein. The plurality of pump signals 518 may be provided by one or more pump sources that may be, for example, a laser, a flash lamp, or an electric current.

Each of the unitary optically transparent amplifier chips 504 that are interposed between the input chip 506 and the output chip 508 are optically coupled to the adjacent amplifier chips via intermediate photon streams 505. For example, the second amplifier chip 512 receives a first intermediate amplified optical signal from the input amplifier chip 506 and provides a second intermediate amplified optical signal to the third amplifier chip 514. Thus in general, the Nth amplifier chip receives an N−1 intermediate amplified optical signal from the N−$1^{st}$ amplifier chip and provides an N intermediate amplified optical signal to the next N+$1^{st}$ amplifier chip in the stacked arrangement. At least one laser pump source is used to provide at least one pump signal to pump for each optical amplifier chip 504. Each of the plurality of amplifier chips 504 can be axially pumped.

To remove heat from the stacked arrangement of amplifier chips 504, at least one optically transparent heat transfer medium 516 may be sandwiched, or interposed for example between the juxtaposed faces 520 and 522 of an adjacent pair of the amplifier chips 512 and 514. Optically transparent heat transfer mediums 516 may be provided between one or more pairs of adjacent amplifiers 504. The actual placement of the optically transparent heat transfer medium(s) 516 are dependent upon the particular system requirements. The optically transparent heat transfer medium 516 may comprise a thin diamond plate thermally coupled to the juxtaposed faces 518 and 520. The heat from each unitary optical amplifier is transferred through the one or more thin diamond plates that are then cooled at their edges by an external heat transfer method, such as an electrothermal cooler or a heat sink.

The optical amplifier may be configured as an optical instrument. For example, the optical amplifier may be configured as a lens in which the center of the lens is doped and pumped appropriately. Alternatively, the optical amplifier can be configured as a prism, an alignment prism, or a dove prism. Other optical configurations can also be used depending on the optical requirements of the particular system. Thus, in addition to amplifying the incoming optical signal, other optical manipulations of the incoming signal photons may be accomplished simultaneously in order to reduce the size, weight, and complexity of a system.

Figure 3:
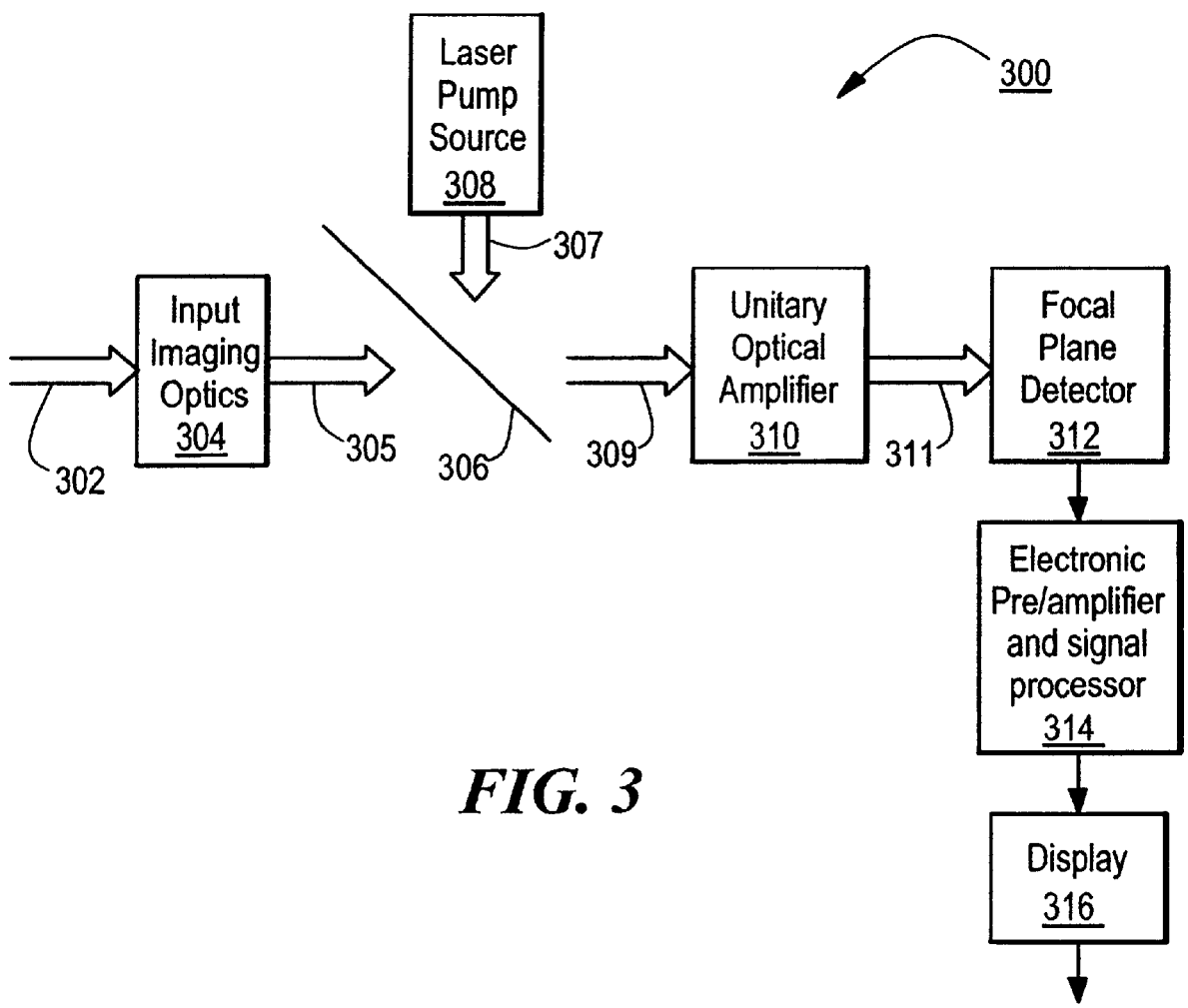
FIG. 3 is a block diagram of a LADAR system including the active optical amplifier depicted in FIG. 1.

The unitary optical amplifier that is described above may be included in a focal plane laser direction and ranging (LADAR) system 300 as illustrated in FIG. 3. The LADAR system 300 includes a plurality of input signal photons 302 having a first wavelength, a first spatial orientation, and a first phase that are typically reflected from one or more objects in the field of view when illuminated by a laser source (not shown). The spatial orientation of the input photons is indicative of the shape, spacing, and in some cases the depth of the objects within the field of view. The input photons are optically coupled by an input imaging optics system 304 and a dichroic mirror 306 to a unitary optical amplifier 310. A laser pump source provides a laser pump signal 307 that is used to pump the unitary optical amplifier 310 to create a population inversion of electrons as described above. The unitary optical amplifier 310 provides a plurality of output signal photons 311 that are greater in number and that have the same spatial orientation, wavelength, and phase than the corresponding input signal photons 302. The output signal photons 311 are optically coupled to a focal plane image detector 312 such as a CCD or other optical to electrical signal converter. The converted electrical signals are processed and amplified by an electronic pre/amplifier-signal-processor, and displayed on a conventional electronic Typically, there are two broad categories of LADAR systems. One is a Continuos Wave (CW) system that provides 2-dimensional information, but does not provide range data to a target unless other processing is provided to the illumination signal. A CW LADAR system will typically have a lower peak power but a higher average power than a pulse LADAR system described below. Because the unitary optical amplifier used in a CW LADAR system will be continuously providing amplification, the problem of transferring heat from the unitary optical amplifier is an important consideration. As discussed above, various methods of heat transfer may be employed and in a CW LADAR system, a method that provides a sufficient heat transfer rate from the optically transparent heat transfer medium such as an electrothermal Peltier cooler may be employed.

In a pulsed LADAR system, the illumination of the target is accomplished using pulsed lasers such that the system is capable of providing range information of the target as well. In this way a pulsed LADAR system can be constructed using the unitary optical amplifier in conjunction with a PIN detector array that would allow for individual photon counting and high resolution target imaging.

In a pulsed LADAR system, the average power in the receiver is much lower than the CW LADAR system described above, but the peak power is much higher. As such, depending on the power levels used, a surface cooling system employing a heat sink thermally coupled to the optically transparent heat transfer medium and to the ambient environment may be sufficient to transfer heat at a sufficient rate from the unitary optical amplifier.

The unitary optical amplifier, whether used in the CW LADAR system described above, or the pulsed LADAR system, should be operated in the small signal portion of the amplifier gain. In this way, the medium comprising the unitary optical amplifier will not be depleted, and any distortion of the output signal may be kept to a minimum.

Those of ordinary skill in the art should further appreciate that variations to and modification of the above-described methods, apparatus and system for constructing a unitary optical amplifier and a LADAR system incorporating the unitary optical amplifier may be made without departing from the inventive concepts disclosed herein. Accordingly, the invention should be viewed as limited solely by the scope spirit of the appended claims.

What is claimed is:

1. An optical amplifier system comprising:
    imaging optics for receiving input photons corresponding to an image and for producing redirected input photons having a phase and trajectory;
    a pump source for providing a pump signal; and
    an optical amplifier comprising a unitary optically transparent solid geometric chip, having at least a portion that is homogeneously doped to be optically active and that is oriented to receive said pump signal and said redirected input photons, said chip being responsive to said pump signal and receipt of said redirected input photons to generate as an output additional generated photons having substantially the same phase and trajectory as the corresponding redirected input photons, wherein the additional photons are greater in number than the number of redirected input photons.

2. The optical amplifier of claim 1 wherein each of the input photons have a polarization and wherein each of the generated photons has substantially the same polarization as the corresponding input photon.

3. The optical amplifier of claim 1 wherein the unitary optically transparent solid geometric chip is constructed of glass.

4. The optical amplifier of claim 3 wherein the unitary optically transparent solid geometric chip is constructed of a glass selected from the group consisting of silicate glass, phosphate glass, GeO2 glass, and B3O2 glass.

5. The optical amplifier of claim 1 wherein the unitary optically transparent solid geometric chip is a semiconductor.

6. Amplifier of claim 1 wherein the homogeneously doped portion of the unitary optically transparent solid geometric chip is doped with active Erbium ions.

7. The optical amplifier of claim 1 wherein the doped portion of the unitary optically transparent solid geometric chip is doped with active Neodymium ions.

8. The optical amplifier of claim 1 wherein the plurality of input photons have a wavelength between 1.45 and 1.62 microns.

9. The optical amplifier of claim 8 wherein the plurality of input photons have a wavelength of 1.55 microns.

10. The optical amplifier of claim 8 wherein the active Erbium ions are provided by doping the unitary optically transparent solid geometric chip with 2% by weight of $Er_2O_3$.

11. The optical amplifier of claim 1 wherein the amplification optical signal provided by the pump source has a wavelength of 0.980 microns.

12. The optical amplifier of claim 1 further comprising a beam splitting mirror configured and arranged to optically couple the pump signal into the unitary optically transparent solid geometric chip along a longitudinal axis of the unitary optically transparent solid geometric chip, the beam splitting mirror further configured and arranged to optically couple the plurality of input photons on the homogeneously doped portion of the unitary optically transparent solid geometric chip.

13. The optical amplifier of claim 1 further comprising an optically transparent thermal transfer medium thermally coupled to at least one surface of the unitary optically transparent solid geometric chip.

14. The optical amplifier of claim 13 wherein the optically transparent thermal transfer medium is a diamond.

15. The optical amplifier of claim 13 further comprising a heat transfer system thermally coupled to the optically transparent thermal transfer medium to transfer heat from the unitary optically transparent solid geometric chip.

16. The optical amplifier of claim 15 wherein the heat transfer system includes a heat sink thermally coupled to the optically transparent thermal transfer medium.

17. The optical amplifier of claim 15 wherein the heat transfer system includes an electrothermal heat transfer system thermally coupled to the optically transparent thermal transfer medium.

18. The optical amplifier of claim 1 wherein the unitary optically transparent solid geometric chip is pumped with sufficient energy to operate in the small signal region.

19. The optical amplifier of claim 1 wherein a noise figure of the optical amplifier is less than 2.5 dB.

20. The optical amplifier of claim 1 wherein the gain of the optical amplifier is greater than 10 dB.

21. The optical amplifier of claim 1 wherein the solid geometric chip is a cube.

22. The optical amplifier of claim 1 wherein the solid geometric chip is a parallelepiped.

23. The optical amplifier of claim 1 wherein the solid geometric chip is a rod.

24. An optical imaging system comprising:
imaging optics for receiving input photons corresponding to an image for producing redirected input photons having a phase and trajectory;
an optical amplifier having an amplifier input oriented to receive the redirected input photons, the optical amplifier including;
a pump source for providing a pump signal;
a unitary optically transparent solid geometric chip, said chip having at least a portion that is homogeneously doped to be optically active and that is oriented to receive said pump signal and said redirected input photons, said chip being responsive to said pump signal and receipt of said redirected input photons to generate as an output additional generated photons having substantially the same trajectory and phase as the respective redirected input photons, wherein the additional photons are greater in number than the number of redirected input photons; and
a focal plane array including a plurality of photodetectors oriented to receive at least the additional generated photons, the focal plane array being operative to produce electronic signals representative of at least the additional generated photons as an array output.

25. The optical imaging system of claim 24 wherein each of the input photons have a polarization and wherein each of the generated photons provided by the unitary optically transparent solid geometric chip have substantially the same polarization as the corresponding input photon.

26. The optical imaging system of claim 24 wherein the input includes an optical system.

27. The optical imaging system of claim 24 wherein the optical system includes imaging optics.

28. The optical imaging system of claim 24 further comprising an output optical system inserted between the amplifier output and the focal plane array and wherein the output optical system optically couples the amplified output of the unitary optically transparent chip to the focal plane detector.

29. The optical imaging system of claim 28 wherein the output optical system inserted between the amplifier output and the focal plane array includes imaging optics.

30. The optical imaging system of claim 24 further comprising a calibration system configured and arranged to provide correction factors to offset variations in the plurality of output photons.

31. The optical imaging system of claim 24 wherein the homogeneously doped portion of the unitary optically transparent chip is doped with active Erbium ions.

32. The optical imaging system of claim 31 wherein the active Erbium ions are provided by doping the unitary optically transparent chip with 2% by weight of $Er_2O_3$.

33. The optical imaging system of claim 32 wherein the plurality of input photons have a wavelength of 1.55 microns.

34. The optical imaging system of claim 24 wherein the amplification optical signal provided by the pump source has a wavelength of 0.980 microns.

35. The optical imaging system of claim 24 further comprising a dichroic mirror configured and arranged to optically couple the pump signal into the unitary optically transparent solid geometric chip along a longitudinal axis of the unitary optically transparent chip, the dichroic mirror further configured and arranged to optically couple the plurality of input photons to the homogeneously doped portion of the unitary optically transparent solid geometric chip.

36. A The optical imaging system of claim 24 further comprising an optically transparent thermal transfer medium thermally coupled to at least one surface of the unitary optically transparent solid geometric chip.

37. The optical imaging system of claim 36 wherein the optically transparent thermal transfer medium is a diamond.

38. The optical imaging system of claim 36 further comprising a heat transfer system thermally coupled to the optically transparent thermal transfer medium to transfer heat from the unitary optically transparent solid geometric chip.

39. The optical imaging system of claim 24 wherein the unitary optically transparent solid geometric chip is a semiconductor.

40. The optical amplifier of claim 24 wherein the solid geometric chip is a cube.

41. The optical amplifier of claim 24 wherein the solid geometric chip is a parallelepiped.

42. The optical amplifier of claim 24 wherein the solid geometric chip is a rod.

43. An optical amplifier comprising:
imaging optics for receiving input photons corresponding to an image and for producing redirected input photons having a phase and trajectory;
at least one pump source for providing a plurality of pump signals;
a plurality of optical amplifiers each comprising a unitary optically transparent solid geometric chip having an input and output, said plurality of optical amplifiers being arranged sequentially and including at least a first amplifier and a last amplifier in said sequence, each of said optical amplifiers having an optically active homogeneously doped portion oriented to receive at least one of the plurality of pump signals, said first chip being oriented to receive said redirected input photons and being responsive to said pump signal and receipt of said redirected photons to amplify said redirected input photons to generate output photons having substantially the same tranectory and phase as the respective redirected input photons;
each subsequent chip within said sequence being oriented to:
receive said output photons generated at the output of the prior chip in said sequence,
amplify said received photons while maintaining at the output the trajectory and phase of the photons received at said input of the respective chip, and
direct said output photons to said input of said next chip in said sequence;
wherein said output photons from said last chip in said sequence have substantially the same trajectory and phase as said respective redirected input photons.

44. The optical amplifier of claim 43 further including at least one optically transparent thermal transfer medium interposed between each of a pair of juxtaposed surfaces of a pair of adjacent unitary optically transparent solid geometric chips, the optically transparent thermal transfer medium configured and arranged to transfer thermal energy from the unitary optically transparent chip.

45. The optical amplifier of claim 44 wherein the optically transparent thermal transfer medium is a diamond plate thermally coupled to each of the juxtaposed surfaces of the adjacent unitary optically transparent chips.

46. The optical amplifier of claim 44 further comprising a heat transfer system thermally coupled to the optically transparent thermal transfer medium to transfer heat from the unitary optically transparent solid geometric chip.

47. The optical amplifier of claim 43 wherein the doped portion of the unitary optically transparent solid geometric chip is doped with active Erbium ions.

48. The optical amplifier of claim 47 wherein the active Erbium ions are provided by doping the unitary optically transparent solid geometric chip with 2% by weight of $Er_2O_3$.

49. The optical amplifier of claim 43 wherein the doped portion of the unitary optically transparent solid geometric chip is doped with active Neodymium ions.

50. The optical amplifier of claim 43 wherein the plurality of input photons have a wavelength between 1.45 and 1.62 microns.

51. The optical amplifier of claim 43 wherein the amplification optical signal provided by the pump source has a wavelength of 0.980 microns.

52. The optical amplifier of claim 51 wherein the plurality of input photons have a wavelength of 1.55 microns.

53. The optical amplifier of claim 43 wherein each of the input photons have a polarization and wherein plurality of generated photons provided by one of the unitary optically transparent solid geometric chips has substantially the same polarization as the corresponding input photon.

54. The optical amplifier of claim 43 wherein each of the plurality unitary optically transparent solid geometric chip is constructed of glass.

55. The optical amplifier of claim 54 wherein the plurality of unitary optically transparent solid geometric chips is constructed of a glass selected from the group consisting of silicate glass, phosphate glass, $GeO_2$ glass, and $B_3O_2$ glass.

56. The optical amplifier of claim 43 wherein each of the plurality of solid geometric chip is a cube.

57. The optical amplifier of claim 43 wherein each of the solid geometric chips is a parallelepiped.

58. The optical amplifier of claim 43 wherein the solid geometric chips is a rod.

* * * * *

UNITED STATES PATENT AND TRADEMARK OFFICE
CERTIFICATE OF CORRECTION

PATENT NO.    : 6,624,925 B2
DATED         : September 23, 2003
INVENTOR(S)   : Victor Hasson et al.

It is certified that error appears in the above-identified patent and that said Letters Patent is hereby corrected as shown below:

Column 8,
Line 20, "Amplifier" should read -- The optical amplifier --.
Line 44, "on the" should read -- to the --;

Column 10,
Line 8, "A The" should read -- The --;

Column 12,
Line 1, "claim 51" should read -- claim 50 --;
Line 16, "chip" should read -- chips --.

Signed and Sealed this

Seventh Day of March, 2006

JON W. DUDAS
*Director of the United States Patent and Trademark Office*